Sept. 22, 1970
C. E. HAUGH, JR  3,529,434
CONTROL MEANS FOR CONTROLLING A PRODUCER IN RESPONSE TO
A VARIABLE CONDITION OF THE MOTIVE
MEANS DRIVING THE PRODUCER
Filed Sept. 16, 1968  2 Sheets-Sheet 1
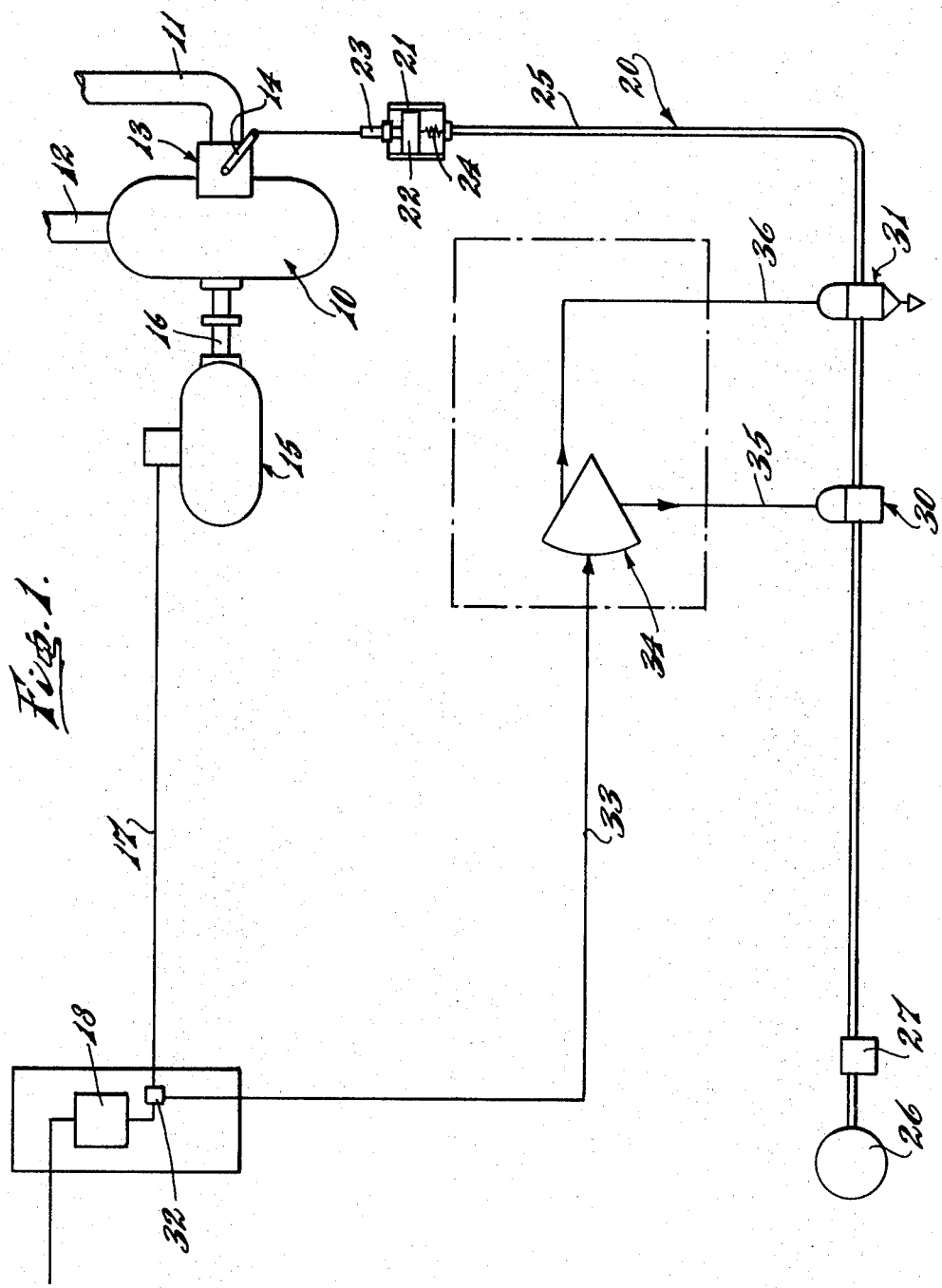
INVENTOR
Chauncey E. Haugh, Jr.
BY Robert K. Youtie
ATTORNEY

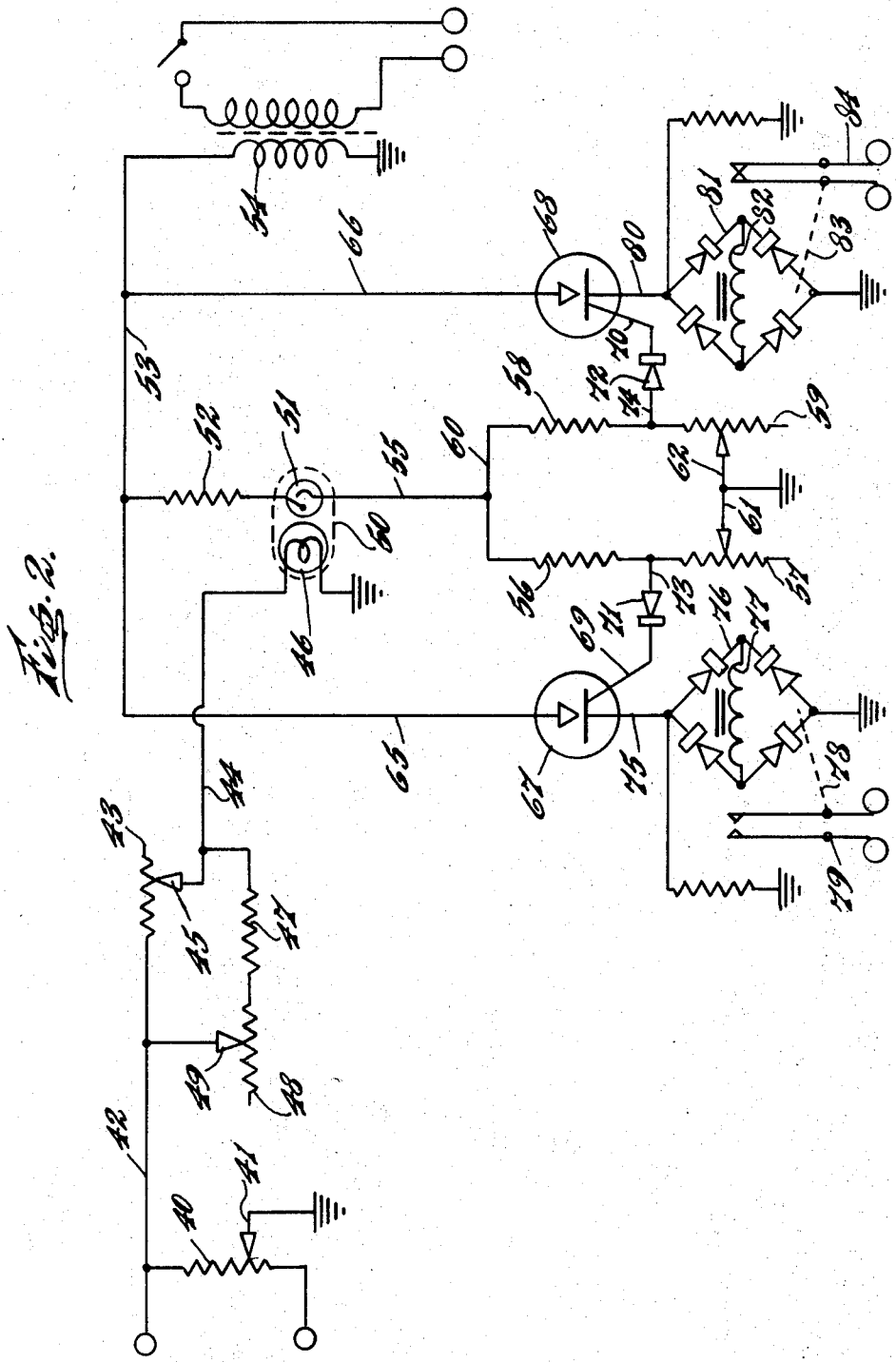

United States Patent Office 3,529,434
Patented Sept. 22, 1970

3,529,434
CONTROL MEANS FOR CONTROLLING A PRODUCER IN RESPONSE TO A VARIABLE CONDITION OF THE MOTIVE MEANS DRIVING THE PRODUCER
Chauncey E. Haugh, Jr., 106 Pocahontas & Omaha Trails, Medford Lakes, N.J. 08055
Filed Sept. 16, 1968, Ser. No. 759,949
Int. Cl. F25b 1/00
U.S. Cl. 62—230          8 Claims

ABSTRACT OF THE DISCLOSURE

In conjunction with a producer and motive means driving the producer, means for sensing a variable condition of the motive means, means for loading the producer, a controller for stabilizing the loading means at a predetermined value of the variable condition being sensed, and an additional controller for unloading the producer responsive to an excess of the value being sensed.

BACKGROUND OF THE INVENTION

While the device of the instant invention has been primarily developed and employed for use in air-conditioning systems, and will be illustrated and described hereinafter with particular reference thereto, it is appreciated that the instant invention is capable of many varied applications all of which are intended to be comprehended herein. For example, the instant control system may be employed in conjunction with a propane engine, say to sense manifold pressure, and in a wide variety of other systems being controlled in response to a sensed condition.

SUMMARY OF THE INVENTION

It is an important object of the present invention to provide controls of the type described which operate in a positive manner, rather than by hunting, proportional operation or the like, so as to enhance simplicity and reliability, and effectively protect components from damage.

It is a more particular object of the present invention to provide a control apparatus having the advantageous characteristics mentioned in the preceding paragraph, wherein a stabilizing control is operative to maintain a predetermined desirable condition, and an unloading control is operative upon a predetermined increment of excess beyond the desired condition.

Other objects of the present invention will become apparent upon reading the following specification and referring to tthe accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a diagrammatic representation of a control apparatus of the present invention in operative association with an air-conditioning system or the like.

FIG. 2 is a schematic representation of an operating system as within the dashed outline of FIG. 1.

DESCRIPTION OF THE PREFERRED EMBODIMENT

Referring now more particularly to the drawings, and specifically to FIG. 1 thereof, a producer is there generally designated 10, and may be a centrifugal pump, as in a commercial refrigeration or air-conditioning system. The pump 10 may include an inlet conduit 11 and an outlet conduit 12, both conduits being connected in fluid communication with the pump. Interposed in the inlet conduit 11 may be suitable pump loading means 13, such as an adjustable valve, adjustment thereof being affected by movement of a lever or arm 14.

In driving relation with the pump or producer 10 may be motive means 15, say an electric motor having a drive shaft 16 operatively connected to the pump. An electric power line 17 is illustrated as being connected between a starter box 18 and the motor 15.

The pump loading means or valve 13 may be actuated by a pneumatic or fluid pressure system generally designated 20. The fluid pressure system 20 may include a cylinder 21 having a piston 22 connected by a piston rod 23 to the valve adjustment arm 14. The piston 22 may be resiliently biased as by a spring 24 to urge the piston in a direction tending to close the valve 13 and unload the pump. Connected in fluid communication with the cylinder 21 on one side of the piston 22 is one end of a fluid pressure conduit or line 25. The other end of the fluid conduit 25 may be connected to a source of pressurized fluid, as at 26, say a source of compressed air or the like. Interposed in the upstream region of the conduit 25, adjacent to the source of pressurized fluid 26 may be a temperature control valve 27 or other means for controlling the output of pump 10 by adjustment of valve 13. That is, under normal operating conditions the temperature control valve 27 or other may provide an air signal in conduit 25 by varying the pressure therein to selectively position piston 22 in cylinder 21, and consequently adjust valve 13. It will be observed that piston 22 is resiliently biased against the pressure exerted through conduit 25 and tends to close valve 13 or unload pump 10 upon decrease in fluid pressure in the system 20.

In addition, there is interposed in the fluid conduit 25 a first controller 30, which may be an on-off or shut-off valve, located downstream of the control valve 27. Also interposed in the fluid conduit 25, located between the controller or valve 30 and cylinder 21 is a second controller or valve 31. However, the controller or valve 31 is a bleed valve for bleeding pressure from the conduit 25 downstream of the controller 30.

Sensing means is generally designated 32 and senses electric current in line 17 to the motor 15. The sensing means 32 may be a current transformer or other suitable sensing means as desired. The sensing means 32 is connected, by suitable conductor means 33 to an operating means, generally designated 34. In this manner a signal correponding to motor current is transmitted from the sensing means 32 through conductor means 33 to the operating means 34. The operating means 34 is connected by respective connections 35 and 36 to controllers 30 and 31.

OPERATION

The operating means 34 provides two separate and adjustable output signals through respective connections 35 and 36 to controllers 30 and 31. The controller or valve 30 is normally open to transmit full line pressure through the conduit 25; and, the controller or valve 36 is normally closed, so as to prevent the bleeding or dissipation of pressure from conduit 25 while transmitting full pressure therethrough. Obviously, the controllers or valves 30 and 31 may be part of a single valve, if desired, being illustrated for simplicity as separate valves.

Upon a rise in the value of current in line 17 to motor 15 to the rated current of the motor, this current level is sensed by sensing means 32 and appropriate signal is transmitted therefrom through line 33 to the operating means 34. The operating means is responsive to motor current reaching its rated value to actuate or energize, through connection 35, the controller or valve 30 to close the latter. This effectively stabilizes or maintains substantially constant fluid pressure in conduit 25 downstream of the controller 30, to substantially stabilize or hold the position of loading valve 13 through its control arm 14. In this condition, the loading valve 13 is isolated from signals of the temperature control valve 27 so that further loading of the pump 10 by loading valve 13 is prevented. Upon reduction in the value of motor current in line 17, which is sensed by sensor 32 and transmitted through conductor 33 to operating means 34, the signal through connection 35 to controller 30 is removed and the controller or shut-off valve 30 is opened, for continued operation in the condition with motor 15 below full rated current.

On the other hand, should current to motor 15 through supply line 17 increase beyond its rated value, after the rated value had been sensed and effected closure of controller or valve 30, a predetermined value of motor current increase beyond rated value causes the operating means 34 to provide a signal through connection 36 to controller or bleed valve 31 serving to open the bleed port thereof. In this insipient overload condition, fluid pressure is bled from conduit 25 permitting movement of piston 22 and consequently of valve control arm 14 to the valve 13 and unload or remove load from the pump 10. This condition remains until motor current, as sensed by sensors 32, returns to below the predetermined increment above rated current. Thereupon the bleed port of controller or valve 31 closes, and upon continued reduction of motor current to below its rated value, the controller or valve 30 opens to restore the system to its original condition. As a practical matter, the operating means 34 may effect closure of controller or valve 30 at one hundred percent of rated motor current, and may effect opening of controller or valve 31 at, say one hundred and three percent of rated motor current, or other desired increment in excess of rated motor current, as considered safe.

OPERATING MEANS

Referring now to FIG. 2, there is shown a schematic representation of one embodiment of operating means, previously referred to generally in the description of FIG. 1. A resistance 40 is connected across the signal from sensing means 32 as from line 33 and provided with a selectively adjustable grounded contact 41. A conductor 42 is connected to one side of resistor 40 and provided with a resistance 43. A conductor 44 is provided at one end with a selectively adjustable contact 45 engaging resistor 43, and has its other end grounded. Interposed in series in the conductor 44 is a lamp or illumination means 46. Additionally, a resistor 47 is connected at one end to conductor 44 between contact 45 and lamp 46, and is provided at its other end with a calibration resistor 48. An adjustable potentiometer contact 49 is connected to the conductor 42 for selective engagement with the resistor 48.

Thus, the potentiometer 40, 41 serves to compensate for variations in the sensor 32 and line 33, while the potentiometer 43, 45 provides adjustment to control current through illumination means 46. The resistor 47 and potentiometer 48, 49 affords calibration to satisfy variations in bulb brilliance to current ratios.

Close coupled in a light tight enclosure 50, together with the lamp or illumination means 46, is a light dependent resistor or photocell 51. The light dependent resistor or photocell 51 is connected on one side through a resistor 52, to a conductor 53, which is connected to an alternating voltage source or transformer 54. Connected to the other side of the photocell 51 is a conductor 55 which is, in turn, connected to a voltage divider network including a first pair of series connected resistors 56 and 57, and a second pair of series connected resistors 58 and 59. The pair of resistors 56 and 57 are connected in parallel with the pair of resistors 58 and 59, as by a conductor 60, which is connected to the conductor 55. A pair of adjustable contacts 61 and 62 are respectively engageable with resistors 57 and 59 and connected to ground.

A pair of supply conductors 65 and 66 are connected to supply line 53, and respective rectifiers 67 and 68 are electrically connected in conductors 65 and 66. The rectifier 67 and 68 may be silicon controlled rectifiers, each including a respective gate, as at 69 and 70. A pair of gate diodes 71 and 72 are connected to the gate conductors 69 and 70 of respective silicon controlled resistors 67 and 68. further, the diode 71 is connected on its input side, as by conductor 73, to a point between series connected resistors 56 and 57; and, the input of diode 72 is connected by a conductor 74 to a point intermediate the series connected resistors 58 and 59.

The base of SCR 67 is connected by a conductor 75 to a bridge type diode rectifier 76, which includes inductance 77 coupled, as at 78 to relay contacts 79, which are in turn connected to valve 30. Similarly, the base of SCR 68 is connected by a conductor 80 to a bridge-type diode rectifier 81 which includes an inductance 82 coupled, as at 83, to the relay contacts 84 associated with controller or valve 31.

OPERATION OF OPERATING MEANS

An alternating voltage level is afforded from the supply sources 54 through the resistor network of resistor 52, photocell 51, resistors 56 and 57, to the gate of SCR 67 by means of diode 71. For a given light level at the lamp 46, photocell 51 will have a given resistance and current will flow in the voltage divider 56 and 57 to ground. Adjustment of potentiometer contact 61 sets the voltage level at the gate of SCR 67. When the gate of SCR 67 is triggered, current will flow through SCR 67 and bridge rectifier 76 to ground. The bridge rectifier supplies D.C. current to the inductance 77 and effects closure of relay contact 79. This supplies line voltage to valve 30 and closes the valve. This is the condition upon motor current in conductor 17 being sensed at one hundred percent rated value.

Assuming solenoid valve 30 is closed by the above described operation, if the motor current is reduced then the brilliance of lamp 46 is reduced. This increases the resistance of photocell 51 and lowers the voltage available to diode 71 and the gate of SCR 67. With the gate voltage below the trigger level, current flow will stop through SCR 67 and open relay contacts 79 to open valve 30.

On the other hand, if closure of valve 30 is insufficient to maintain or reduce current to motor 15, and current rises above a predetermined increment over rated value, say five amperes or otherwise as desired, the lamp 46 will produce a higher light output and further reduce the resistance of photocell 51. This provides more current in the voltage divider 56, 57, 58 and 59; and, potentiometer contact 62 is adjusted to trigger SCR 68 when motor current reaches the predetermined value in excess of rated value. Triggering of SCR 68 passes current through bridge rectifier 81 and energizes reactance 82 to actuate valve 31. Actuation of valve 31 effects opening of the bleed port to reduce fluid pressure in conduit 25 and thereby unload the pump 10. Upon reduction of motor current, the bleed port of valve 31 closes and the above described procedure is reversed.

From the foregoing, it is seen that the present invention provides a control system which fully accomplishes its intended objects and is well adapted to meet practical conditions of manufacture, installation and use.

Although the present invention has been described in some detail by way of illustration and example for purposes of clarity of understanding, it is understood that certain changes and modifications may be made within

What is claimed is:

1. For use in a system including a producer and motive means driving said producer; control means for controlling the producer responsive to a variable condition of the motive means; sensing means for sensing said variable condition, loading means for applying load to the producer, a first controller connected to said sensing and loading means and responsive to said variable condition attaining a predetermined value to stabilize said loading means at its position then corresponding to said predetermined value, and a second controller connected to said sensing and loading means and responsive to said variable condition exceeding said predetermined value to release said loading means and remove load from said producer to reduce said variable condition.

2. Control means according to claim 1, said loading means comprising a fluid pressure actuated system, and said first controller comprising a shut-off valve in said fluid pressure actuated system to maintain a stable pressure in said fluid pressure actuated system.

3. Control means according to claim 2, said second controller comprising a bleed valve in said fluid pressure actuated system to reduce pressure therein.

4. Control means according to claim 3, said bleed valve being interposed in said fluid pressure actuated system downstream of said shut-off valve to reduce pressure in said fluid pressure actuated system.

5. Control means according to claim 1, wherein said producer comprises a pump and said motive means comprises an electric motor, said sensing means comprising a current sensor sensing the current of said motor, and said loading means comprising an adjustable valve connected with said pump.

6. For use in a system including a producer and motive means driving the producer; control means for controlling the producer responsive to a variable condition of the motive means and comprising; sensing means for sensing said variable condition, loading means for applying load to the producer, a first controller connected to said sensing and loading means and responsive to said variable condition attaining a predetermined value to stabilize said loading means, a second controller connected to said sensing and loading means and responsive to said variable condition exceeding said predetermined value to release said loading means, said producer comprising a pump, said motive means comprising an electric motor, said sensing means comprising a current sensor sensing the current of said motor, said loading means comprising an adjustable valve connected with said pump, and operating means connected between said sensing means and said pair of controllers, said operating means comprising a power source, first and second relay means respectively associated with said first and second controllers to operate the same, first and second rectifier means electrically connected between said power source and respective first and second relay means, first and second voltage divider means electrically connected between said power source and the gates of respective first and second rectifier means, and variable resistance means electrically interposed between said power source and said pair of voltage divider means and associated with said sensing means for resistance variation responsive to sensed current variation, said variable resistance means effecting gating of respective rectifier means through associated voltage divider means responsive to sensing of said predetermined value of current and an excess of said predetermined value.

7. Controller means according to claim 6, said variable resistor means being illumination actuable, and said sensing means including illuminating means.

8. Control means according to claim 6, said power source being alternating current and said relay means being direct current, and rectifier bridge means interposed between each rectifier means and its associated relay means.

References Cited

UNITED STATES PATENTS

| 2,817,213 | 12/1957 | Miner | 62—209 |
| 2,955,436 | 10/1960 | Miner | 62—230 XR |
| 2,983,111 | 5/1961 | Miner | 62—227 XR |
| 3,003,331 | 10/1961 | Coburn | 62—230 XR |
| 3,380,262 | 4/1968 | Miner | 62—230 |

MEYER PERLIN, Primary Examiner